Aug. 27, 1935.  S. G. TILDEN  2,012,838
NOISE DAMPENER FOR BRAKE DRUMS
Filed Oct. 17, 1933
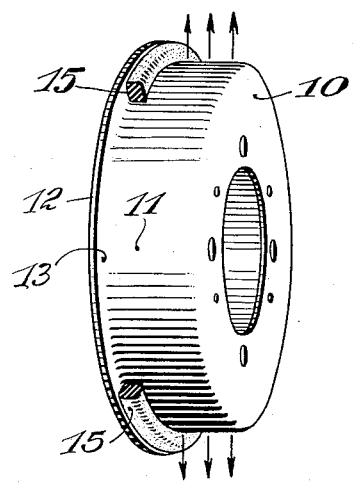
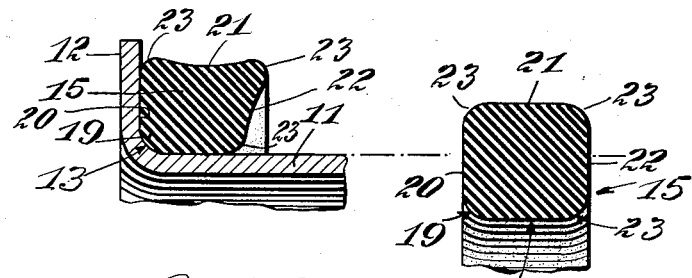
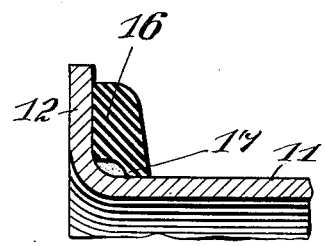
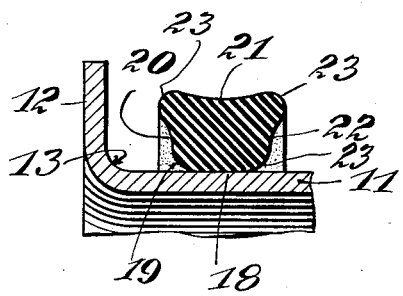
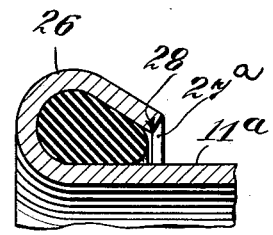
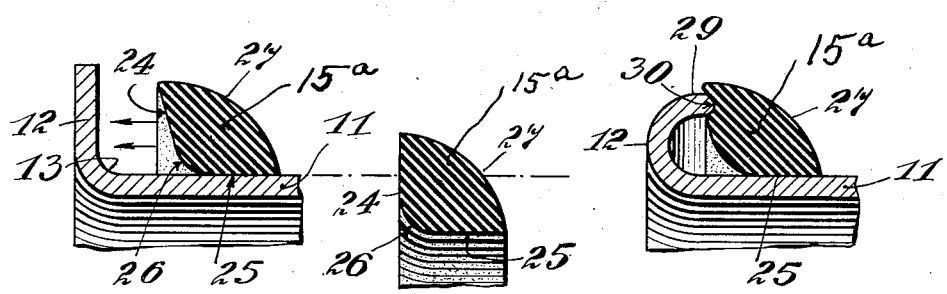
INVENTOR
Sydney G. Tilden
BY C. P. Goepel.
his ATTORNEY Patented Aug. 27, 1935

2,012,838

UNITED STATES PATENT OFFICE 2,012,838

NOISE-DAMPENER FOR BRAKE DRUMS

Sydney G. Tilden, Stewart Manor, Long Island, N. Y.

Application October 17, 1933, Serial No. 693,899

7 Claims. (Cl. 188—218)

This invention relates to noise-dampeners for brake drums and has for its purpose and object to provide a simple and inexpensive noise-dampener which may be readily applied to an existing brake drum, or to a brake drum during the course of its manufacture.

Researches in noise-producing qualities of brake drums have shown that they act in the nature of bells or trumpets, in that the vibrations are amplified by the shape of the drum, and vibrations so set up often produce a very objectionable noise on the application of the brakes. Several attempts have been made to overcome such noise-producing vibrations, but the proposed devices have inherent objectionable features, and while they may to some extent reduce noise, they present other obstacles as, for instance, the prevention of heat radiation from the drum.

This invention finds its embodiment in a dampener placed in such a position on the flange of the brake drum as to permit nearly the usual amount of heat radiation therefrom, and also placed close to the flare of the flange, the dampener preferably being of one piece of rubber having an interior diameter less than the diameter of the exterior surface of the brake drum, so as to require stretching of the dampener upon its application to the brake drum. Due to the inherent resiliency of the material of which the dampener is composed, the dampener will remain in that position in which it is placed; and owing to the molecular disposition of the material of which the dampener is composed, a stretching of the rubber will so dispose the dampener that it will maintain constant tension against the brake drum and assume a predetermined position. Such stretching or distorting of the rubber will enable the dampener to be applied in a certain manner; and for its preferred use, the dampener is pressed against the flare of the drum and due to the inherent resiliency of the material, will maintain pressure against the flare of the brake drum, at which point of the brake drum the amplitude of the vibrations is greatest. Sufficient mass of material is provided to accomplish the object set forth and inherent rotational balance is particularly included in the improved dampener.

My improved dampener is simple in structure, inexpensive to manufacture, and is easily applied; and due to its inherent resiliency the dampener remains at any predetermined part of the brake drum flange, and because of this advantage and its structural attributes, the dampener bears towards the flare of the brake drum when stretched circumferentially thereof, and placed in proximity thereto.

The invention will be more particularly described hereinafter, embodiments thereof shown in the accompanying drawing, and finally pointed out in the appended claims.

In the accompanying drawing:—

Figure 1 is a perspective view of a brake drum such as is well known and in common use, having an embodiment of my invention applied thereto;

Figure 2 is a transverse section of the end of the brake drum, showing the flange and the flare as part thereof, with an embodiment of my invention applied thereto;

Figure 3 is a longitudinal section of an embodiment of my invention shown in relation to the surface of the brake drum, the dampening ring not being under tension, that is, the dampener is not stretched to the brake drum diameter;

Figure 4 is a similar longitudinal section showing the dampening ring under tension;

Figure 5 is a view showing the functional interrelationship of the constituent elements of my improved ring;

Figure 6 is a longitudinal section of my improved ring embraced by a bead formed at the end of the brake drum, the ring being applied during the course of manufacture of the brake drum;

Figure 7 is a sectional view of another embodiment of my improved ring, showing the dampening ring under tension, bearing towards the flare of the drum;

Figure 8 shows the ring before its application to the brake drum; and

Figure 9 is a sectional view of an embodiment of my invention applied to a different type of brake drum, having a rounded flare.

Referring to the drawing, and more particularly to Figure 1, the usual brake drum therein shown, has a web 10, a flange 11, and a flaring member or flare 12.

Upon the exterior of the flange is placed a circular, and preferably a unitary, ring composed of rubber or similar material. The ring has an internal diameter of smaller dimension than that of its external diameter, the difference in the diameters being greater than the thickness of the material forming the ring. The cross sectional area of the ring is such that it provides a sufficient mass which will deaden the vibrations. The interior diameter of the ring being smaller than the diameter of the exterior surface of the drum flange, stretching of the ring is required in order to apply it to the exterior of the brake drum, and upon application to the brake drum the ring remains in its applied position wherever placed due to its inherent resiliency.

The rubber ring is stretched or expanded circumferentially on its application around the periphery of the drum so that it is held in place thereon by its natural inherent contractibility. As it is moved against the drum flare in its contracted or tensioned state, it becomes more or less distorted from the position in which it is placed so as to fit tightly between the surfaces of the flange and flare, exerting pressure thereon and thereby extending itself into the fillet. Thereby, a very simple means is provided for dampening the vibrations of the brake drum when the interior ring of rubber or other suitable mass, is applied to a brake drum. In view of its firm and straight lines, the ring may be applied in reverse condition, that is it may be turned inside out, its outer periphery thus becoming the part for contacting the flange. In the various embodiments shown in the drawing, it will be noted that the brake drum 10 has a flange 11 and laterally thereof a flare 12; and it will also be observed that the resilient ring has contact with the flange of the brake drum and with the flare 12 of the flange 11. In certain of these embodiments, the resilient ring has such configuration that when applied to the flange of the brake drum it distorts itself in a flared manner and these flared portions exert a lateral pressure against any object in the path of such lateral pressure. The ring 15 of Fig. 3 is clearly shown when distorted in Fig. 4, the curved sidewalls forming flared portions, and similarly in the embodiment of Fig. 8, when the ring is distorted, it presents a flared portion, as shown in Fig. 7.

It has been found that the greatest amplitude of vibrations is present at the flare 12 of the drum, and therefore the ring is adapted for application directly to the flare, thus acting in the nature of a mute and deadens noises. From Figure 2 it will be seen that the dampener 15 presses against the inner surface of the flare 12, and also against the external surface of the flange 11, and in the embodiment shown, the material of the ring 15 covers the fillet 13 of the flare. The functional action of the ring is shown diagrammatically in Figure 5, wherein the larger surface portion 16 abuts against the flare 12 and a smaller portion 17 of narrower surface, abuts against the flange 11, the advantage being that the larger surface acts as a mute, that is deadens the sound, and the smaller surface 17 acts on the flange, allowing as much room as possible on the flange for heat radiation purposes. These functional constituent elements find their counterpart in the embodiment shown in Figures 2 and 3.

In the preferred embodiment, the cross sectional configuration of the ring is such that when circumferentially stretched its sectional periphery is distorted in such a manner as to press the ring against the flare 12, as shown in Figures 2 and 9, and the tendency to do so is shown in Figures 4 and 7.

The cross sectional configuration of ring 15 of Fig. 3, is such that a straight surface 18 corresponds to the innermost circumference of the ring, and adjacent thereto is a curved portion 19, so that when the ring is applied to the flange 11, the curved portion 19 will fit snugly into the fillet 13 of the flare, for which purpose the curvature of the portion 19 is substantially made equal to that of the fillet 13. The remaining contour of ring 15, that is, surfaces 20, 21, and 22, in Figure 3, may be so arranged with intermediate curved parts 23, that a symmetrical contour is provided. In such case, any of the four surfaces can be placed in contact with the flange 11. These opposed symmetrical surfaces need not necessarily be the same, since, as shown in the embodiment of Figures 7 and 8, two flat surfaces 24 and 25, an intermediate curved surface 26, and an exterior curved surface 27, may be used. The curved surface 26 in this case, does not fit snugly into the fillet, but a space may remain therebetween, so that all of the side thrust is concentrated on flare 12, rather than distributed between the flare and the fillet.

In Figure 3, the ring is shown prior to being placed on the flange, and in an unstretched condition, and in Figure 4, the ring is shown distorting itself into substantially the position there shown owing to its peculiar configuration.

The rings described, are especially adapted to brake drums now in use. It is sometimes preferable, during the manufacture of a brake drum, to build therein a dampener embodying my invention, and for this purpose, the rubber is applied to the extreme end of the flange 11a, which is then upset to form a circumferential bead 26 and which entirely surrounds the rubber ring. Sufficient space 27a is left between the innermost edge 28 of the bead 26 and the flange 11a, to allow removal of the encaptured rubber ring and to permit insertion of a new ring therebetween. In another embodiment, the space can be larger or smaller, and even closed altogether, the ring being applied in the manner described and then the bead 26 closed thereon.

In Figure 9 is shown a bent-over portion 29 forming a continuation of the flare 12, corresponding to certain brake drums now in use, and having the embodiment of the ring shown in Figure 8 applied thereto. The pressure inherent in this ring 15a causes the material thereof to be displaced, and a groove 30 formed therein.

The rings 15 and 15a are of one continuous piece structure, molded in any manner or by any process well known to the molders of rubber, adapted to bring about a molecular disposition of the particles composing the structure, so that the action herein described is carried out. The ring is of course molded so as to have substantially the same consistency and construction throughout its length so as to form one piece. In certain forms of application this is not essential, as will be clear from the foregoing, and in such a case other primary elements of the invention described, become foremost in the operation of the ring.

I have described herein various embodiments of my invention, but realize that changes and modifications may be made therein without departing from the spirit or scope of the invention, as defined in the appended claims.

I claim:—

1. A noise dampener for brake drums comprising a one-piece rubber ring, adapted to be applied to the exterior of a brake drum, and having a configuration the width of which is substantially equal to its height and relatively small in respect to the surface extent in an axial direction of the flange of the brake drum, and having an internal diameter less than the external diameter of the flange of the brake drum, and adapted to be stretched upon said flange and remain in position thereon, the body of the ring having a thickness sufficient to produce when distorted, a flare adapted to engage the flare of the flange in hugging contact therewith.

2. A noise dampener for brake drums comprising a one-piece ring made of rubber, adapted to be applied to the exterior of a brake drum, said ring having a body thickness, and having an internal diameter less than the external diameter of the flange of the brake drum, and adapted to be stretched upon said flange and remain in position thereon, the body thickness being sufficient to provide for lateral distortion of the ring from the position in which it is placed, to cause a lateral pressure against said flare.

3. A noise dampener for brake drums comprising a ring having an internal diameter less than the external diameter of the brake drum flange, and adapted to be stretched thereon, said ring having a relatively thick body with a cross sectional configuration forming a flange contacting straight side, and flare contacting straight side, all of the sides of the ring being straight and the body being reversible thereby enabling any of the sides to contact with the flange, and the adjacent side of the ring to contact with the flare of the brake drum, and due to the lateral distortion of the ring to exert a lateral pressure upon the flare of the brake drum.

4. A noise dampener for brake drums comprising a ring having an internal diameter less than the external diameter of the flange of a brake drum and adapted to be stretched in position thereon, said ring when so stretched distorting itself to bear against the flare of the flange of the brake drum, to exert lateral pressure upon the flare of the flange of the brake drum.

5. A noise dampener for brake drums, comprising a continuous unitary ring having an internal and external diameter, the internal diameter of said ring being smaller than the external diameter of the flange of a brake drum, said ring having a width substantially equal to its thickness and held by its own inherent resiliency at any part of the flange of the brake drum when stretched and placed thereon, and said ring having its own inherent resiliency to distort at least one side of the ring to bear towards the flare of the flange of the brake drum and exert pressural contact upon said flare.

6. In a noise dampener for brake drums, the combination of a ring surrounding the flange of the drum, and an extension forming a bead upon said flange circumferentially enclosing said ring.

7. A noise dampener for brake drums, the latter comprising a flange with a flare at one end, said dampener comprising an elastic ring the interior diameter of which is less than the external diameter of the flange whereby the ring will have a contractible tight fit upon the flange to hold it in place thereon, said ring having a body of substantial thickness distortible to produce an end flare for constrictively engaging the end flare of the flange while engaging the flange.

SYDNEY G. TILDEN.